US010482768B1

(12) United States Patent
Sato et al.

(10) Patent No.: US 10,482,768 B1
(45) Date of Patent: Nov. 19, 2019

(54) VEHICLE FUNCTION IMPAIRMENT DETECTION (71) Applicant: DENSO International America, Inc., Southfield, MI (US)

(72) Inventors: Miki Sato, Novi, MI (US); Ting-Yu Lai, Southfield, MI (US); Markos Gerges, Southfield, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/973,725

(22) Filed: May 8, 2018

(51) Int. Cl.
  *G08G 1/16*  (2006.01)
  *B60Q 9/00*  (2006.01)
  *G08G 1/04*  (2006.01)
  *G01S 7/02*  (2006.01)
  *G01S 13/93*  (2006.01)

(52) U.S. Cl.
  CPC ............ *G08G 1/166* (2013.01); *B60Q 9/008* (2013.01); *G01S 7/023* (2013.01); *G08G 1/04* (2013.01); *G08G 1/164* (2013.01); *G01S 13/931* (2013.01)

(58) Field of Classification Search
  CPC .......... G08G 1/166; G08G 1/04; G08G 1/164; G10S 7/023; G01S 13/931; B60Q 9/008
  USPC ........................................................ 340/435
  See application file for complete search history.

(56) References Cited

U.S. PATENT DOCUMENTS

| 6,035,053 A | 3/2000 | Yoshioka et al. |
| 6,370,475 B1* | 4/2002 | Breed .................. B60N 2/2863 340/436 |
| 6,639,541 B1* | 10/2003 | Quintana ................ G01S 19/21 342/18 |
| 6,861,959 B1 | 3/2005 | Torres Sabate et al. |
| 8,195,394 B1 | 6/2012 | Zhu et al. |
| 8,954,252 B1 | 2/2015 | Urmson et al. |
| 9,014,905 B1 | 4/2015 | Kretzschmar et al. |
| 9,481,366 B1 | 11/2016 | Gordon et al. |
| 9,672,446 B1 | 6/2017 | Vallespi-Gonzalez |
| 10,048,353 B2* | 8/2018 | Vogt ........................ G01S 7/023 |
| 2002/0022927 A1 | 2/2002 | Lemelson et al. |
| 2006/0274149 A1 | 12/2006 | Yoshizawa |
| 2007/0001896 A1* | 1/2007 | Hellsten .................. G01S 7/023 342/25 D |
| 2008/0186223 A1* | 8/2008 | Mayer ..................... G01S 7/032 342/109 |

(Continued)

FOREIGN PATENT DOCUMENTS

WO  WO-1997016059 A2  5/1997
WO  WO-2014067380 A1  5/2014

*Primary Examiner* — Ojiako K Nwugo
(74) *Attorney, Agent, or Firm* — Harness, Dickey & Pierce, P.L.C.

(57) ABSTRACT

Systems, methods, and apparatuses are provided and include a receiver module that is configured to receive at least one radar signal. A control module includes a processor that is configured to execute instruction stored in a nontransitory memory. The control module is configured to generate a Fourier transformation based on the at least one radar signal, and the control module is configured to determine a presence of wave interference based on the Fourier transformation. A primary indicator module is configured to, in response to the control module determining the presence of wave interference, generate an indication. The indication corresponds to the presence of wave interference.

10 Claims, 7 Drawing Sheets (56) References Cited

U.S. PATENT DOCUMENTS

| | | | |
|---|---|---|---|
| 2009/0135046 A1* | 5/2009 | Steele | G01S 7/414 342/27 |
| 2010/0159866 A1* | 6/2010 | Fudge | H04B 1/1036 455/302 |
| 2011/0205066 A1* | 8/2011 | Kaufmann | G06F 19/3456 340/573.1 |
| 2012/0213531 A1* | 8/2012 | Nazarathy | H03M 1/145 398/202 |
| 2012/0216286 A1* | 8/2012 | Johnson | G06F 21/64 726/26 |
| 2013/0016798 A1* | 1/2013 | Velazquez | H04B 1/001 375/340 |
| 2015/0158469 A1 | 6/2015 | Cheatham, III et al. | |
| 2015/0228066 A1 | 8/2015 | Farb | |
| 2015/0243165 A1 | 8/2015 | Elsheemy | |
| 2016/0061935 A1* | 3/2016 | McCloskey | G01S 7/023 342/82 |
| 2016/0084941 A1* | 3/2016 | Arage | G01S 7/41 342/91 |
| 2016/0223643 A1* | 8/2016 | Li | G01S 7/023 |
| 2016/0291130 A1* | 10/2016 | Ginsburg | G01S 7/352 |
| 2017/0223712 A1* | 8/2017 | Stephens | H04W 4/90 |
| 2017/0315225 A1* | 11/2017 | Lee | G01S 13/585 |
| 2017/0329332 A1 | 11/2017 | Pilarski et al. | |
| 2017/0343646 A1* | 11/2017 | Bechter | G01S 7/023 |
| 2017/0345292 A1 | 11/2017 | Haran | |
| 2018/0284787 A1* | 10/2018 | Naka | G05D 1/0088 |

\* cited by examiner

VEHICLE FUNCTION IMPAIRMENT DETECTION

FIELD

The present disclosure relates to systems and methods for vehicle function impairment detection.

BACKGROUND

This section provides background information related to the present disclosure and is not necessarily prior art.

Autonomous vehicles, which are vehicles that can operate without human input, can support human operations, such as a pre-accident warning system and an emergency braking system, and are capable of sensing and determining characteristics of the surrounding environment, may include a variety of sensor systems to detect the surrounding environment, such as a radar system. However, when multiple autonomous vehicles are located at, for example, a roadway intersection, the radio waves transmitted and received by the radar systems of the multiple autonomous vehicles may be subjected to radio wave interference. As an example, radio wave interference may occur when a first autonomous vehicle transmits a first radar signal and a second autonomous vehicle near the first vehicle transmits a second radar signal that either constructively or destructively interferes with the first radar signal. Accordingly, certain functions of the autonomous vehicle that are dependent on signals received from the radar system, such as alert and warning functions of an accident notification system, may be impaired by the wave interference. As such, the impairment of the accident notification system may decrease the effectiveness of certain functions of the autonomous vehicle, such as alert and warning functions of the accident notification system, that are dependent on such signals.

SUMMARY

This section provides a general summary of the disclosure, and is not a comprehensive disclosure of its full scope or all of its features.

The present disclosure provides a system a receiver module that is configured to receive at least one radar signal. The system comprises a control module that includes a processor that is configured to execute instruction stored in a nontransitory memory. The control module is configured to generate a Fourier transformation based on the at least one radar signal, and the control module is configured to determine a presence of wave interference based on the Fourier transformation. The system includes a primary indicator module that is configured to, in response to the control module determining the presence of wave interference, generate an indication. The indication corresponds to the presence of wave interference.

In some configurations, the control module is configured to determine the presence of wave interference in response to an amplitude of a noise floor of the Fourier transformation being greater than a threshold amplitude.

In some configurations, the control module is configured to determine the presence of wave interference in response to the Fourier transformation having a harmonic distortion value that is greater than a threshold harmonic distortion value.

In some configurations, the control module is configured to determine the presence of wave interference in response to the Fourier transformation having an unstable noise floor.

In some configurations, the primary indicator module includes at least one of a vibration module, an LED module, and an auditory alert module.

In some configurations, the vibration module includes a vibration motor, a switching element, and a filtering element. In response to the control module determining the presence of wave interference, the control module is configured to provide an indication signal to the switching element. In response to the switching element receiving the indication signal, the switching element is configured to activate the vibration motor. In response to the vibration motor being activated, the vibration motor is configured to generate the indication, and the indication is a haptic alert.

In some configurations, the LED module includes an array of light-emitting diodes. In response to the control module determining the presence of wave interference, the control module is configured to provide an indication signal that activates the array of light-emitting diodes. In response to the array of light-emitting diodes being activated, the array of light-emitting diodes is configured to generate the indication, and the indication is a visual alert.

In some configurations, the auditory alert module includes an electroacoustic transducer. In response to the control module determining the presence of wave interference, the control module is configured to provide an indication signal to the electroacoustic transducer. In response to the electroacoustic transducer receiving the indication signal, the electroacoustic transducer is configured to generate the indication, and the indication is a sound.

In some configurations, a secondary indicator module is configured to broadcast a signal to at least one remote system, and the signal is configured to cause the at least one remote system to generate the indication.

Additionally, the present disclosure provides a method receiving, using a receiver module, at least one radar signal. The method includes generating, using a control module that includes a processor that is configured to execute instruction stored in a nontransitory memory, a Fourier transformation based on the at least one radar signal. The method includes determining, using the control module, a presence of wave interference based on the Fourier transformation. The method includes generating, using a primary indicator module and in response to the control module determining the presence of wave interference, an indication, wherein the indication corresponds to the presence of wave interference.

In some configurations, determining the presence of wave interference is based on an amplitude of a noise floor of the Fourier transformation being greater than a threshold amplitude.

In some configurations, determining the presence of wave interference is based on the Fourier transformation having a harmonic distortion value that is greater than a threshold harmonic distortion value.

In some configurations, determining the presence of wave interference is based on the Fourier transformation having an unstable noise floor.

In some configurations, the primary indicator module includes at least one of a vibration module, an LED module, and an auditory alert module.

In some configurations, the vibration module includes a vibration motor, a switching element, and a filtering element, and the method further comprises, in response to the control module determining the presence of wave interference, providing, using the control module, an indication signal to the switching element. The method further includes, in response to the switching element receiving the indication signal, activating, using the switching element, the vibration motor. The method further includes, in response to the vibration motor being activated, generating, using the vibration motor, the indication, wherein the indication is a haptic alert.

In some configurations, the LED module includes an array of light-emitting diodes, and the method further comprises, in response to the control module determining the presence of wave interference, providing, using the control module, an indication signal to the array of light-emitting diodes, wherein the indication signal is configured to activate the array of light-emitting diodes. The method further includes, in response to the array of light-emitting diodes being activated, generating, using the array of light-emitting diodes, the indication, wherein the indication is a visual alert.

In some configurations, the auditory alert module includes an electroacoustic transducer, and the method further comprises, in response to the control module determining the presence of wave interference, providing, using the control module, an indication signal to the electroacoustic transducer. The method further comprises, in response to the electroacoustic transducer receiving the indication signal, generating, using the electroacoustic transducer, the indication, wherein the indication is a sound.

In some configurations, the method further comprises broadcasting, using a secondary indicator module, a signal to at least one remote system, wherein the signal is configured to cause the at least one remote system to generate the indication.

Additionally, the present disclosure provides an apparatus comprising a receiver module that is configured to receive, at a first location associated with at least one of (i) a user of the apparatus and (ii) a first road, at least one radar signal transmitted by at least one vehicle. The apparatus includes a control module that includes a processor that is configured to execute instruction stored in a nontransitory memory, wherein the control module is configured to generate a Fourier transformation based on the at least one radar signal and determine a presence of wave interference at the first location based on the Fourier transformation. The apparatus includes a primary indicator module that is configured to, in response to the control module determining the presence of wave interference, generate an indication, wherein the indication corresponds to the presence of wave interference.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
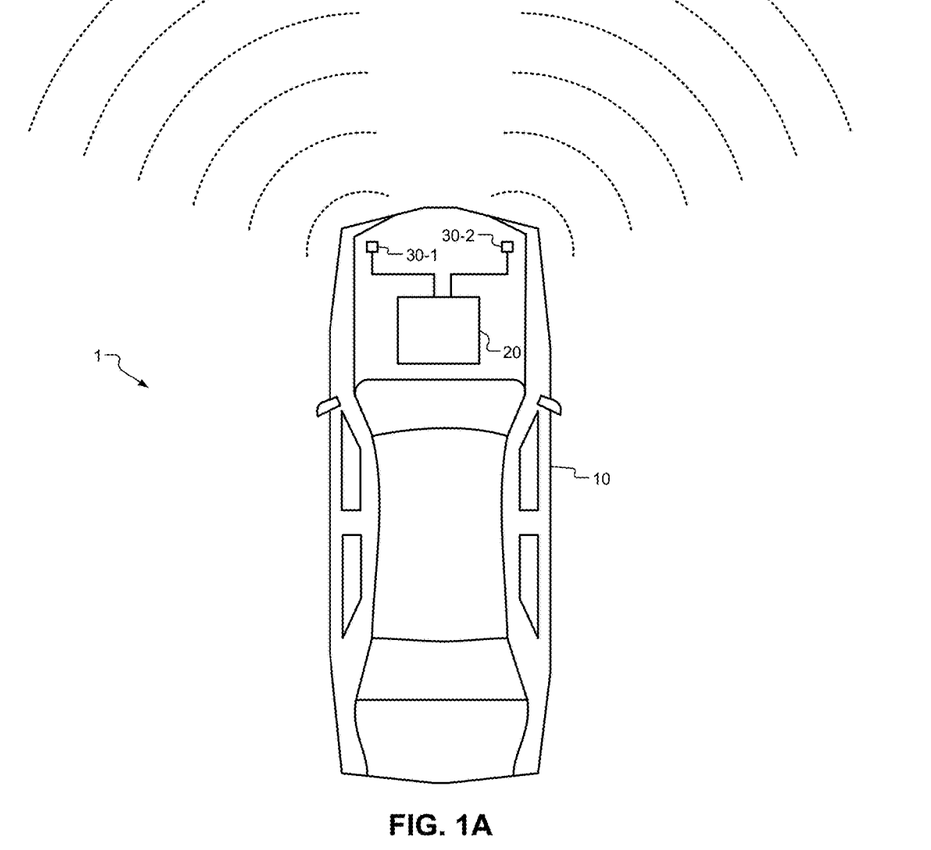
FIGS. 1A-1C illustrate example vehicle and roadway systems according to the present disclosure.

With reference to FIG. 1A, an example vehicle system 1 is shown. The vehicle system 1 includes, for example, a vehicle 10, a vehicle control module 20, and radar transceivers 30-1, 30-2 (collectively referred to as radar transceivers 30). As an example, the vehicle 10 may be an autonomous vehicle, semiautonomous vehicle, or a vehicle that does not include any automated functions and/or features.

The vehicle control module 20 may be configured to, for example, communicate with the radar transceivers 30 to receive signals transmitted by remote vehicles or systems, such as vehicle-to-vehicle and vehicle-to-infrastructure systems, and transmit signals to remote vehicles or vehicle-to-infrastructure systems. Additionally or alternatively, the vehicle control module 20 may be configured to receive or transmit the signals using sonar systems, ultrasonic systems, Lidar systems, dedicated short range communication (DSRC) systems, and camera systems.

In response to the vehicle control module 20 receiving signals from remote vehicles or systems, the vehicle control module 20 may be configured to execute various algorithms. As an example, the vehicle control module 20 may be configured to perform a pre-accident notification function, which predicts future accidents and driving hazards based on communication with remote vehicles and/or systems that are configured to communicate with the vehicle 10, such as vehicle-to-infrastructure systems. Additionally, the vehicle control module 20 may be configured to perform an accident notification function, which generates early warnings of accidents and driving hazards to/from remote vehicles and/or systems. Furthermore, the vehicle control module 20 may be configured to execute various ubiquitous functions implemented by autonomous and semiautonomous vehicles, such as cooperative adaptive cruise control functions, vehicle platooning functions, traffic object detection/identification functions, emergency vehicle detection functions, navigation functions, etc.

In order to execute the functions described above, the vehicle control module 20 may include one or more processors that are configured to execute instructions stored in a nontransitory medium, such as a random-access memory (RAM) and/or a read-only memory (ROM).

The radar transceivers 30 may be configured to transmit radar signals, as indicated by the dotted arcs in FIG. 1A, and the radar transceivers 30 may also be configured to receive various signals. As an example, the radar transceivers 30 may each include a receiver system (not shown) that includes a first antenna of an antenna system, a radio-frequency (RF) filter, a low-noise amplifier, a local oscillator, an intermediate frequency (IF) mixer, an IF filter, and an analog-to-digital converter (ADC). Furthermore, the radar transceivers 30 may each include a transmitter system (not shown) that includes a second antenna of the antenna system, a signal generator, and a power amplifier.

The receiver system (not shown) may be configured to receive various signals via each of the first antennas, and the RF filters and the low-noise amplifiers may suppress image frequencies and prevent the radar transceivers 30 from becoming saturated. The local oscillator then provides a mixing frequency to the frequency mixer in order to change the received frequency into a new, intermediate frequency. The IF filter and the IF amplifier then amplify the signal and limit the intermediate frequencies to a certain bandwidth. Subsequently, the ADC converts the analog signal to a digital signal that can be processed by the vehicle control module 20. The transmitter system (not shown) may be configured to generate signals using the signal generators at a desired frequency (e.g., 24 GHz, 77 GHz, 79 GHz, etc.). The power amplifiers may then increase the range of the signals and then output the signals via the second antenna of each of the corresponding antenna systems.

The components of the radar transceivers 30 may be located at one or multiple locations on a hood, a bumper, and/or a roof of the vehicle 10. Additionally or alternatively, some or all of the components of the radar transceivers 30 may be located on the exterior and/or interior of the vehicle 10.

Figure 1B:
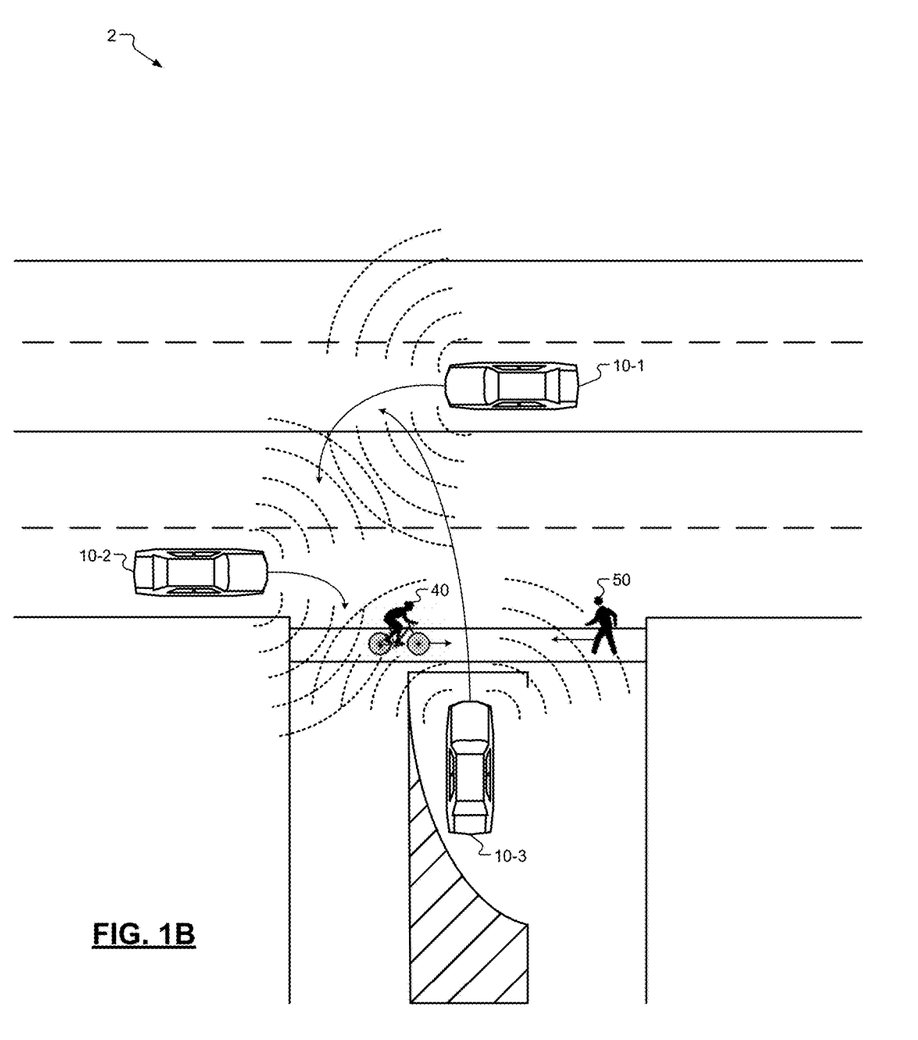

With reference to FIG. 1B, an example roadway system 2 is shown. The example roadway system 2 includes a first vehicle 10-1, a second vehicle 10-2, a third vehicle 10-3, a cyclist 40, and a pedestrian 50. While not shown in FIG. 1B, each of the first, second, and third vehicles 10-1, 10-2, 10-3 includes a respective vehicle control module 20 and radar transceivers 30. In this example embodiment, the first vehicle 10-1 and the third vehicle 10-3 are attempting to make a left-hand turn through an intersection of the roadway system 2, and the second vehicle 10-2 is attempting to make a right turn through the intersection of the roadway system 2, as indicated by the arrows associated with the first, second, and third vehicles 10-1, 10-2, 10-3. Furthermore, the cyclist 40 and the pedestrian 50 are attempting to cross a street of the roadway system 2 via a crosswalk of the roadway system 2, as indicated by the arrows associated with the cyclist 40 and the pedestrian 50.

Each of the first, second, and third vehicles 10-1, 10-2, 10-3 transmits radar signals using the respective radar transceivers 30, as indicated by the dotted arcs associated with each of the first, second, and third vehicles 10-1, 10-2, 10-3. However, the radar signals transmitted by the first vehicle 10-1 and third vehicle 10-3 may interfere with radar signals of the second vehicle 10-2, as indicated by the intersection of the dotted arcs associated with each of the first, second, and third vehicles 10-1, 10-2, 10-3. Accordingly, the pre-accident notification systems of each of the vehicles 10 may be impaired by the wave interference, thereby posing a risk of collision between one or more of the first, second, and/or third vehicles 10-1, 10-2, 10-3, the cyclist 40, and/or the pedestrian 50.

Figure 1C:
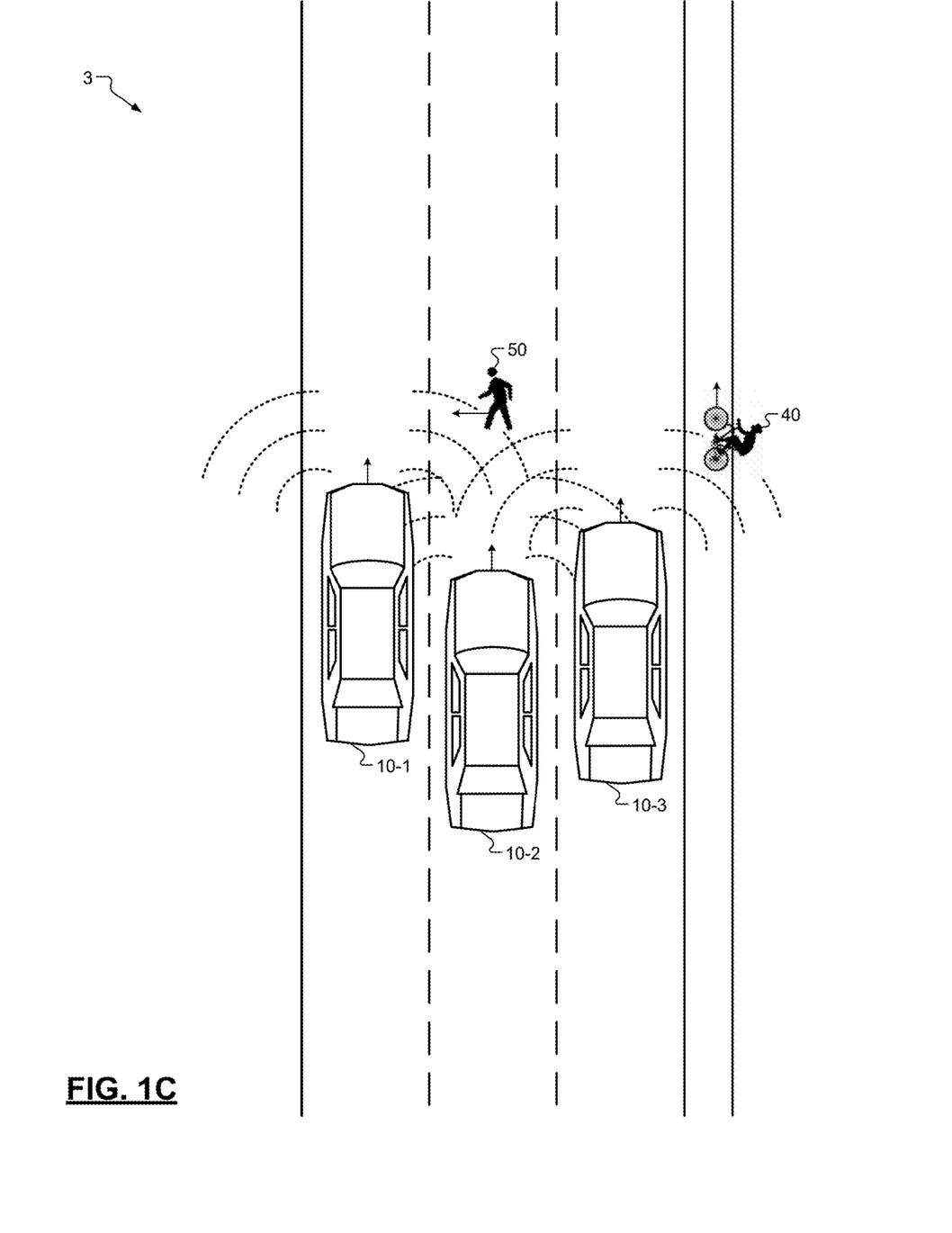

With reference to FIG. 1C, another example roadway system 3 is shown. In this example embodiment, the first, second, and third vehicles 10-1, 10-2, 10-3 are traveling in the same direction, as indicated by the arrows associated with the first, second, and third vehicles 10-1, 10-2, 10-3. Additionally, the cyclist 40 is traveling in the same direction as the first, second, and third vehicles 10-1, 10-2, 10-3 using, for example, a bicycle lane of the roadway system 3, as indicated by the arrow associated with the cyclist 40. Further, the pedestrian 50 is attempting to, for example, improperly cross the street of the roadway system 3, as indicated by the arrow associated with the pedestrian 50.

Similar to the embodiment described above, each of the first, second, and third vehicles 10-1, 10-2, 10-3 transmit radar signals using the respective radar transceivers 30, as indicated by the dotted arcs associated with each of the first, second, and third vehicles 10-1, 10-2, 10-3. However, the radar signals transmitted by the first vehicle 10-1 and third vehicle 10-3 may interfere with radar signals of the second vehicle 10-2, as indicated by the intersection of the dotted arcs associated with each of the first, second, and third vehicles 10-1, 10-2, 10-3. Accordingly, the pre-accident notification systems of each of the vehicles 10 may be impaired by the wave interference, thereby posing a significant threat of severe injury and/or death to the operators of the first, second, and third vehicles 10-1, 10-2, 10-3, the cyclist 40, and the pedestrian 50.

Figure 2A:
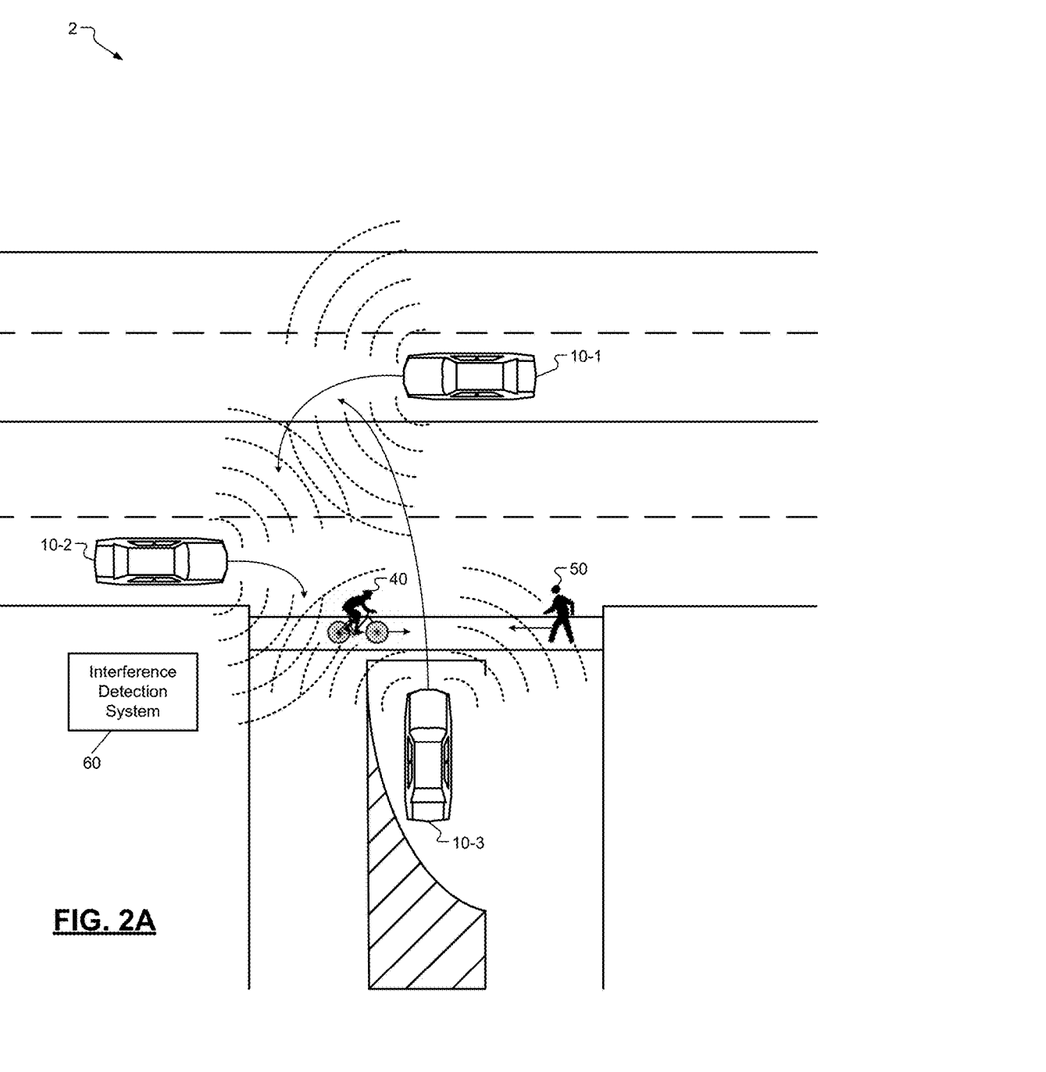
FIGS. 2A-2B illustrate example interference detection systems in a roadway system according to the present disclosure.

With reference to FIG. 2A, an interference detection system 60 within the roadway system 2 is shown. In this embodiment, the interference detection system 60 is implemented at a fixed location, such as an intersection of the roadway system 2. While this embodiment illustrates a single interference detection system 60, in other embodiments, the roadway system 2 may include a plurality of interference detection systems 60. As described below in further detail, the interference detection system 60 is configured to determine a presence of wave interference and generate an indication in response to determining the presence of wave interference.

Figure 2B:
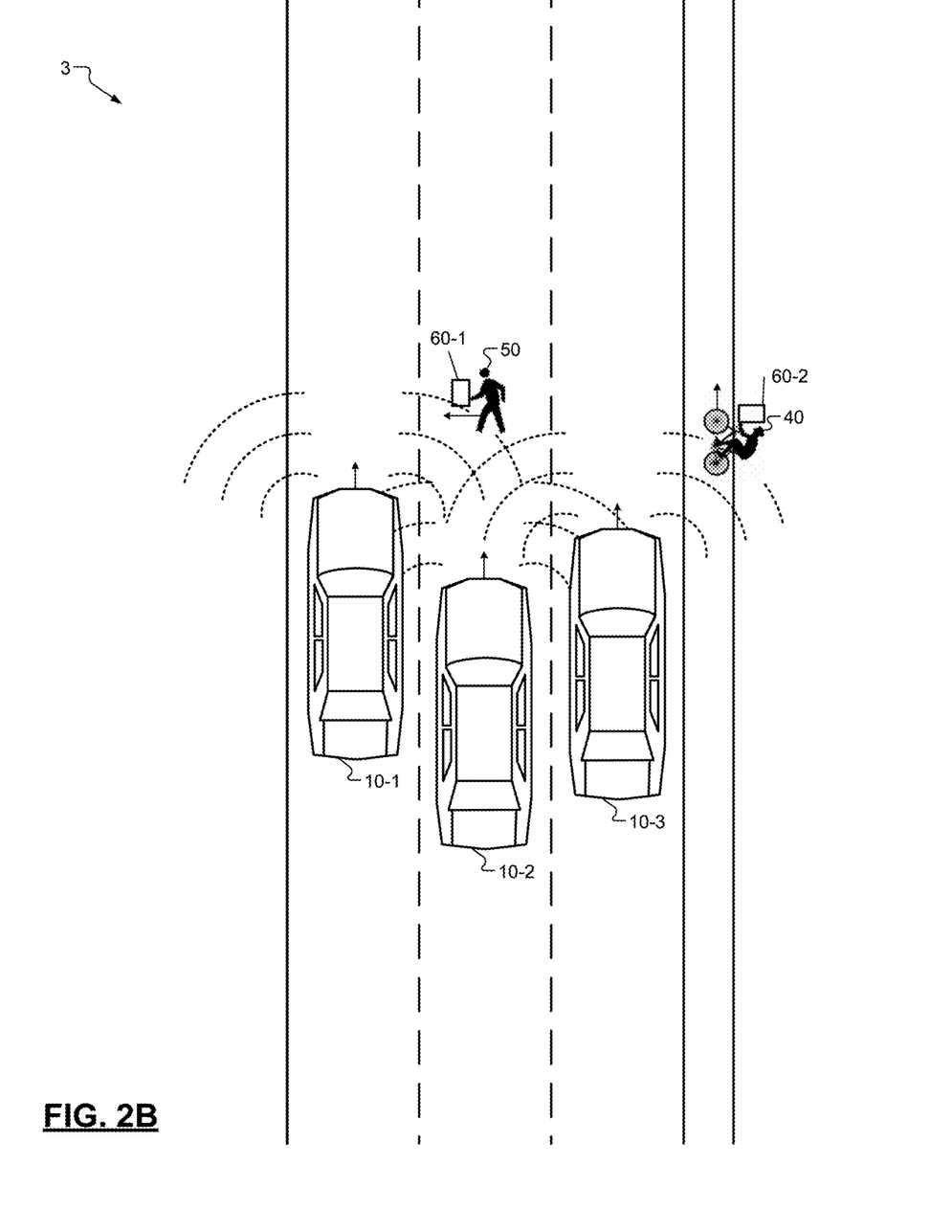

With reference to FIG. 2B, interference detection systems 60-1, 60-2 within the roadway system 3 are shown. In this embodiment, interference detection system 60-1 is a portable device associated with the pedestrian 50, and interference detection system 60-2 is a portable device associated with the cyclist 40. As described below in further detail, the interference detection systems 60-1, 60-2 are configured to determine a presence of wave interference and generate an indication in response to determining the presence of wave interference.

Figure 3:
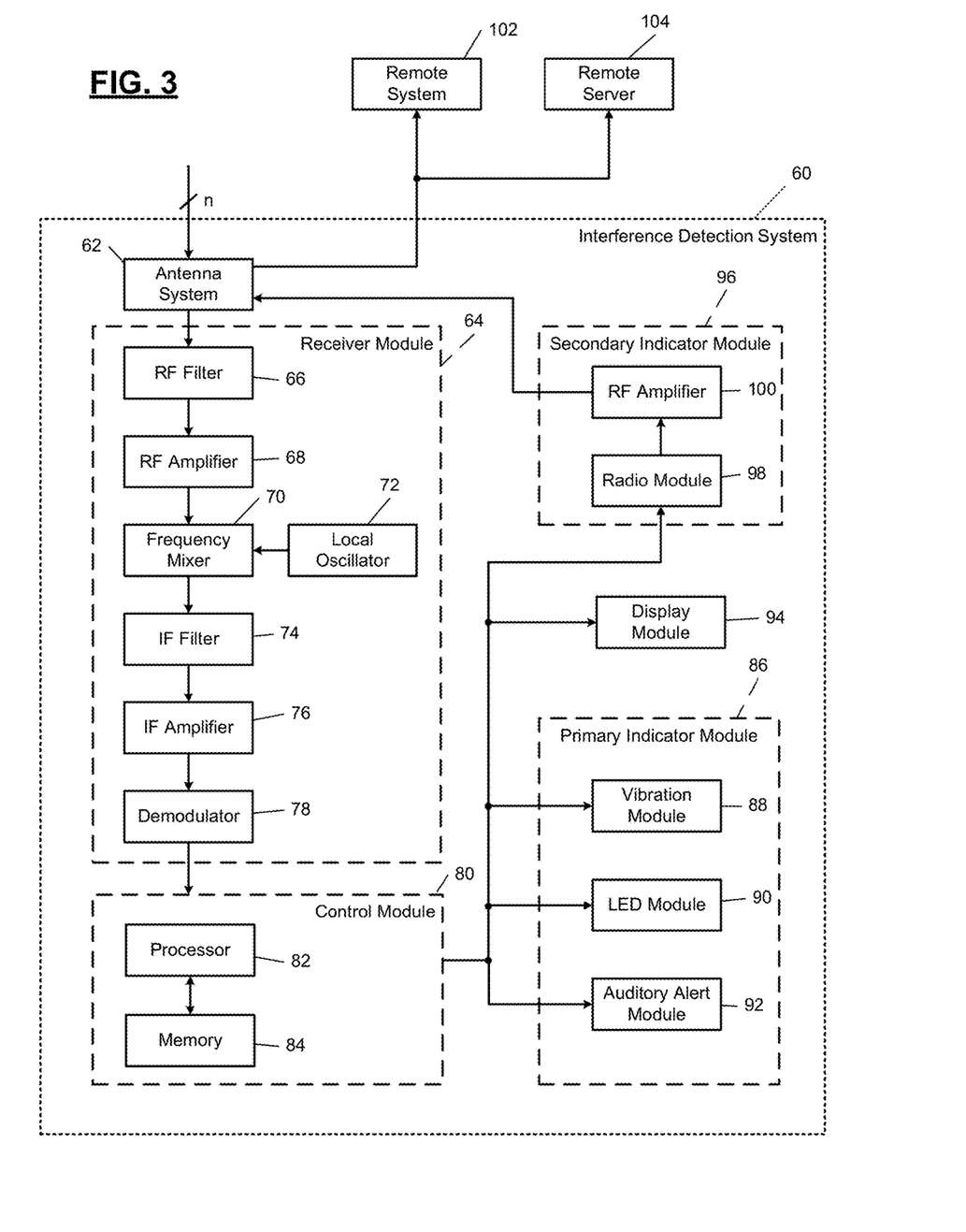
FIG. 3 illustrates an example block diagram of an interference detection system according to the present disclosure.

With reference to FIG. 3, an example block diagram of the interference detection system 60 is shown. In one embodiment, the interference detection system 60 includes an antenna system 62, a receiver module 64, a control module 80, a primary indicator module 86, a display module 94, and a secondary indicator module 96.

In one embodiment, the receiver module 64 is configured to receive signals via the antenna system 62. The receiver module 64 may include an RF filter 66 and an RF amplifier 68 to suppress image frequencies and to prevent the system from becoming saturated. A local oscillator 72 of the receiver module 64 may be configured to provide a mixing frequency to a frequency mixer 70 in order to change the received frequency into a new, intermediate frequency. An intermediate frequency (IF) filter 74 and an IF amplifier 76 may be configured to amplify the signal and limit the intermediate frequencies to a certain bandwidth. Subsequently, a demodulator 78 may extract the desired modulation from the filtered intermediate frequency and provide the extracted signal to the control module 80.

The control module 80 is configured to determine whether the extracted signal indicates whether wave interference exists at a location near the interference detection system 60. As an example, the control module 80 may be configured to perform a Fourier transformation algorithm on the extracted signal. Moreover, the control module 80 may generate a plot and/or table of various frequencies and detected powers at the corresponding frequencies. Based on the plot and/or table, the control module 80 may determine whether wave interference exists at a location near the interference detection system 60. Determining the presence of wave interference based on the Fourier transformation algorithm is described below in further detail with reference to FIG. 4.

In order to execute the Fourier transformation algorithm and to generate the indication signal, which is described below in further detail, the control module 80 may include a processor 82 that is configured to execute instructions in a memory 84, which may be a nontransitory memory component, such as a random-access memory (RAM) and/or a read-only memory (ROM).

In response to detecting the presence of wave interference, the control module 80 is configured to generate an indication signal that activates the primary indicator module 86. As an example, the indication signal may be configured to activate a vibration module 88 of the primary indicator module 86. In one embodiment, the vibration module 88 includes a vibration motor, a switching element (e.g., a bipolar junction transistor, a metal-oxide-semiconductor field-effect transistor, an insulated-gate bipolar transistor, etc.), and filtering elements that absorb voltage spikes (e.g., a capacitor). Specifically, in response to the indication signal activating the switching element of the vibration module 88, the vibration motor is activated and subsequently generates a haptic alert (i.e., a vibration) that indicates the presence of wave interference.

Additionally or alternatively, the indication signal may be configured to activate an LED module 90 of the primary indicator module 86. In one embodiment, the LED module 90 includes an array of light-emitting diodes that are configured to emit light in response to receiving the indication signal from the control module 80.

Additionally or alternatively, the indication signal may be configured to activate an auditory alert module 92 of the primary indicator module 86. In one embodiment, the auditory alert module 92 includes an electroacoustic transducer that is configured to convert the indication signal received into a sound (e.g., beeping noise, voice instructions, etc.). Accordingly, the sound generated by the auditory alert module 92 may correspond to the presence of wave interference.

Additionally or alternatively, the control module 80 may be configured to provide the indication signal to the display module 94, which may be configured to, in response to receiving the indication signal, display an object on a user interface of the display module 94 indicating the presence of wave interference. In one embodiment, the object may be a graphic and/or text corresponding to the presence of wave interference.

Additionally or alternatively, in response to detecting the presence of wave interference, the control module 80 is configured to generate and provide the indication signal to the secondary indicator module 96. As an example, the indication signal may be provided to a radio module 98, which is configured to generate various telemetric signals based on the indication signal. As a more specific example, the radio module 98 may generate DSRC signals, LTE or other cellular signals, Bluetooth or Bluetooth low energy (BLE) signals, Wi-Fi signals, and/or other telemetric signals suitable for wireless communication. The telemetric signals are then broadcasted to at least one of a remote system 102 and a remote server 104 via power amplifier 100 and the antenna system 62. The remote system 102 may be implemented by a radar system and control module of a remote vehicle and/or vehicle-to-infrastructure system, a mobile device (e.g., a smartphone), a portable device that is configured to receive signals from the secondary indicator module 96, a computer, and other similar devices.

In one example embodiment, if the remote system 102 is a remote vehicle, the secondary indicator module 96 may transmit a DSRC signal to the remote vehicle that is displayed on a corresponding dashboard. Specifically, in response to receiving the signal from the secondary indicator module 96, the control module of the remote vehicle may generate the following message for display on the corresponding dashboard:

"WARNING: Various vehicle functions may be impaired as a result of wave interference. Please proceed with caution."

In one example embodiment, if the remote system 102 is a mobile device, the secondary indicator module 96 may transmit an LTE signal to the mobile device. Specifically, in response to receiving the signal from the secondary indicator module 96, the mobile device may display the following message on a corresponding user interface:

"WARNING: Various vehicle functions of nearby vehicles may be impaired as a result of wave interference. Please use sidewalks, crosswalks, and bicycle lanes with caution."

In one example embodiment, the remote server 104 may be configured to, in response to receiving a signal from the secondary indicator module 96 and using a processor that is configured to execute instructions stored in a nontransitory memory (e.g., RAM and/or ROM) of the remote server 104, generate an entry in a database of the remote server 104. Moreover, the database of the remote server 104 may include a plurality of entries associated with indications of wave interference received from a plurality of wave interference detection systems 60. Based on the plurality of entries, the remote server 104 may be configured to generate a table and/or graphic representation of the presence of wave interference at various locations of a roadway infrastructure. As a more specific example, the remote server 104 may be configured to generate a map that is displayed on a user interface of or in communication with the remote server 104. Moreover, the map may include visual indicators at various locations that represent the presence of wave interference. Furthermore, the visual indicators of the map may be dynamic, or in other words, the map may represent locations that are currently detecting wave interference. Alternatively, the visual indicators of the map may be static, or in other words, the map may represent locations that detect wave interference at selected time instances.

Figure 4:
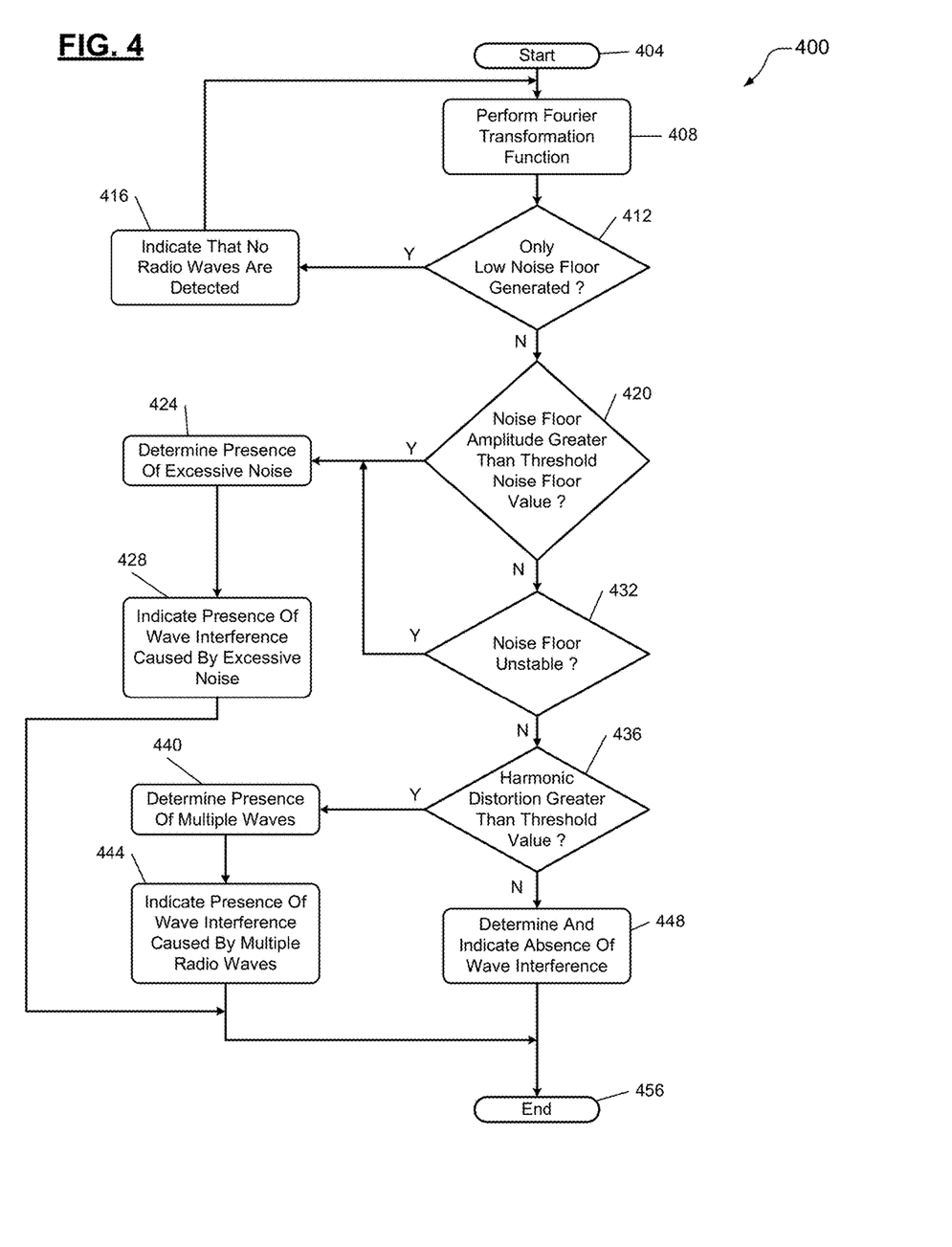
FIG. 4 illustrates an example control algorithm according to the present disclosure.

With reference to FIG. 4, a flowchart for a control algorithm 400 for operating the interference detection system 60 is shown. The control algorithm 400 begins at 404 when, for example, the interference detection system 60 is turned on. At 408, the control algorithm 400 performs, using the control module 80, a Fourier transformation function on the signals received by the receiver module 64. At 412, the control algorithm 400 determines, using the control module 80, whether only a low noise floor is generated by the Fourier transformation function. As an example, if the Fourier transformation function generates a plot and/or table that only indicates the presence of a low noise floor, the receiver module 64 may be receiving a noise signal having a constant amplitude (e.g., white noise). If the control algorithm 400 determines the presence of only a low noise floor, the control algorithm 400 proceeds to 416; otherwise, the control algorithm 400 proceeds to 420. At 416, the control algorithm 400 indicates, using at least one of the primary indicator module 86, the display module 94, and/or the secondary indicator module 96, that no radio waves (e.g., radar signals) are detected and proceeds to 408.

At 420, the control algorithm 400 determines, using the control module 80, whether an amplitude of the noise floor is greater than a threshold noise floor value. If so, the control algorithm 400 proceeds to 424; otherwise, the control algorithm 400 proceeds to 432. At 424, the control algorithm 400 determines, using the control module 80, the presence of excessive noise and then proceeds to 428. At 428, the control algorithm 400 indicates, using at least one of the primary indicator module 86, the display module 94, and/or the secondary indicator module 96, the presence of wave interference caused by the excessive noise and proceeds to 456.

At 432, the control algorithm 400 determines, using the control module 80, whether the noise floor value is unstable. In other words, the control algorithm 400 determines whether other variable noise signals are being received by the receiver module 64. If the control algorithm 400 determines that the noise floor is unstable, the control algorithm 400 proceeds to 424; otherwise, the control algorithm 400 proceeds to 436. At 436, the control algorithm 400 determines, using the control module 80, whether a harmonic distortion of the resulting plot and/or table is greater than a threshold distortion value. The harmonic distortion may be defined as a ratio of a sum of the powers of all harmonic components with respect to the power of the fundamental frequency of the Fourier transformation function. As an example, a higher harmonic distortion may indicate the presence of wave interference, and a lower harmonic distortion may indicate the absence of wave interference. If the harmonic distortion is greater than the threshold harmonic distortion value, the control algorithm 400 proceeds to 440; otherwise, the control algorithm 400 proceeds to 448.

At 440, the control algorithm 400 determines, using the control module 80, the presence of multiple waves and proceeds to 444. At 444, the control algorithm 400 indicates, using at least one of the primary indicator module 86, the display module 94, and/or the secondary indicator module 96, the presence of wave interference caused by the multiple radio waves (e.g., radio signals) and proceeds to 456. At 448, the control algorithm 400 determines and indicates the absence of wave interference and proceeds to 456. At 456, the control algorithm 400 ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
a receiver module that is configured to receive at least one radar signal;
a control module that includes a processor that is configured to execute instruction stored in a nontransitory memory, wherein the control module is configured to:
generate a Fourier transformation based on the at least one radar signal; and
determine a presence of wave interference in response to the Fourier transformation having a harmonic distortion value that is greater than a threshold harmonic distortion value; and
a primary indicator module that is configured to, in response to the control module determining the presence of wave interference, generate an indication, wherein the indication corresponds to the presence of wave interference;
wherein:
the primary indicator module includes at least one of a vibration module, an LED module, and an auditory alert module;
the vibration module includes a vibration motor, a switching element, and a filtering element;
in response to the control module determining the presence of wave interference, the control module is configured to provide an indication signal to the switching element;
in response to the switching element receiving the indication signal, the switching element is configured to activate the vibration motor;
in response to the vibration motor being activated, the vibration motor is configured to generate the indication; and
the indication is a haptic alert.

2. The system of claim 1, wherein the control module is configured to determine the presence of wave interference in response to an amplitude of a noise floor of the Fourier transformation being greater than a threshold amplitude.

3. The system of claim 1, further comprising a secondary indicator module that is configured to broadcast a signal to at least one remote system, wherein the signal is configured to cause the at least one remote system to generate the indication.

4. The system of claim 1, wherein the control module is further configured to determine the presence of wave interference in response to the Fourier transformation having an unstable noise floor.

5. A method comprising:
receiving, using a receiver module, at least one radar signal;
generating, using a control module that includes a processor that is configured to execute instruction stored in a nontransitory memory, a Fourier transformation based on the at least one radar signal;
determining, using the control module, a presence of wave interference based on the Fourier transformation having a harmonic distortion value that is greater than a threshold harmonic distortion value; and
generating, using a primary indicator module and in response to the control module determining the presence of wave interference, an indication, wherein the indication corresponds to the presence of wave interference;
wherein:
the primary indicator module includes at least one of a vibration module, an LED module, and an auditory alert module;
the vibration module includes a vibration motor, a switching element, and a filtering element,
the method further comprises:
in response to the control module determining the presence of wave interference, providing, using the control module, an indication signal to the switching element;

in response to the switching element receiving the indication signal, activating, using the switching element, the vibration motor; and in response to the vibration motor being activated, generating, using the vibration motor, the indication, wherein the indication is a haptic alert.

6. The method of claim 5, wherein determining the presence of wave interference is based on an amplitude of a noise floor of the Fourier transformation being greater than a threshold amplitude.

7. The method of claim 5, further comprising broadcasting, using a secondary indicator module, a signal to at least one remote system, wherein the signal is configured to cause the at least one remote system to generate the indication.

8. The method of claim 5, wherein determining the presence of wave interference is based on the Fourier transformation having an unstable noise floor.

9. An apparatus comprising:
a receiver module that is configured to receive, at a first location associated with at least one of (i) a user of the apparatus and (ii) a first road, at least one radar signal transmitted by at least one vehicle;
a control module that includes a processor that is configured to execute instruction stored in a nontransitory memory, wherein the control module is configured to:
generate a Fourier transformation based on the at least one radar signal; and
determine a presence of wave interference at the first location in response to the Fourier transformation having a harmonic distortion value that is greater than a threshold harmonic distortion value; and
a primary indicator module that is configured to, in response to the control module determining the presence of wave interference, generate an indication, wherein the indication corresponds to the presence of wave interference;

wherein:
the primary indicator module includes at least one of a vibration module, an LED module, and an auditory alert module;
the vibration module includes a vibration motor, a switching element, and a filtering element;
in response to the control module determining the presence of wave interference, the control module is configured to provide an indication signal to the switching element;
in response to the switching element receiving the indication signal, the switching element is configured to activate the vibration motor;
in response to the vibration motor being activated, the vibration motor is configured to generate the indication; and
the indication is a haptic alert.

10. The apparatus of claim 9, wherein the control module is configured to determine the presence of wave interference in response to the Fourier transformation having an unstable noise floor.

* * * * *

UNITED STATES PATENT AND TRADEMARK OFFICE
CERTIFICATE OF CORRECTION

PATENT NO. : 10,482,768 B1  
APPLICATION NO. : 15/973725  
DATED : November 19, 2019  
INVENTOR(S) : Miki Sato et al.

Page 1 of 1

It is certified that error appears in the above-identified patent and that said Letters Patent is hereby corrected as shown below:

On the Title Page

Column 1, (22) Filed, Line 1: After "2018", insert --¶(65) Prior Publication Data US 2019/0347937 A1 Nov. 14, 2019--

Signed and Sealed this  
Twenty-fifth Day of February, 2020

Andrei Iancu  
*Director of the United States Patent and Trademark Office*